F. BLANDING.
Loom-Shuttle.
No. 160,001.  Patented Feb. 23, 1875.
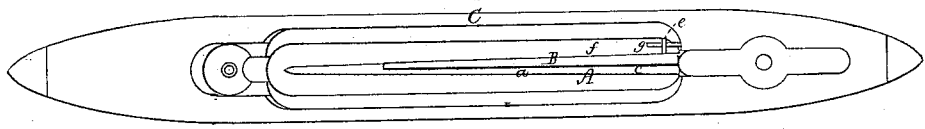
Fig. 1.
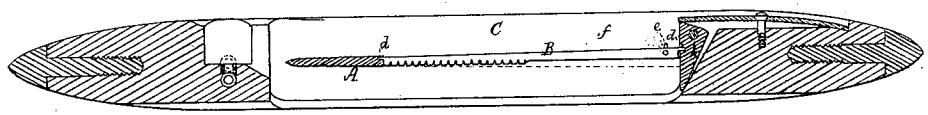
Fig. 2.
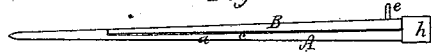 
Fig. 3.  Fig. 4.
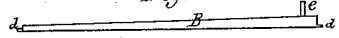
Fig. 6.
Fig. 5.
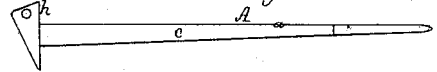
Fig. 7.
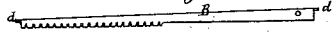
Fig. 8.
Witnesses.  
S. N. Piper  
L. W. Miller
Francis Blanding  
by his attorney  
R. H. Eddy
THE GRAPHIC CO. PHOTO-LITH. 39 & 41 PARK PLACE, N.Y.

UNITED STATES PATENT OFFICE.

FRANCIS BLANDING, OF CANTON, MASSACHUSETTS, ASSIGNOR TO HIMSELF AND THOMAS B. WATTLES, OF SAME PLACE.

IMPROVEMENT IN LOOM-SHUTTLES.

Specification forming part of Letters Patent No. 160,001, dated February 23, 1875; application filed November 25, 1874.

*To all whom it may concern:*

Be it known that I, FRANCIS BLANDING, of Canton, in the county of Norfolk and State of Massachusetts, have invented a new and useful Improvement in Loom-Shuttles; and do hereby declare the same to be fully described in the following specification, and represented in the accompanying drawings, of which—

Figure 1 is a top view, and Fig. 2 a longitudinal section, of a shuttle provided with my invention. Fig. 3 is a top view, and Fig. 4 a transverse section, of the spindle and its rotary tongue. Figs. 5 and 6 are top views of the spindle and tongue.

The object of my invention is to hold a cop securely on the spindle when the latter is down in the cop-chamber of the shuttle, and also to enable a cop to be readily placed upon or withdrawn from the spindle when the latter is turned up or elevated to its highest position out of the said chamber.

In carrying out my invention, I construct the spindle A with a long recess, $c$, to receive a rotary tongue, B, formed as shown. At its ends the said tongue or rock-shaft B has eccentric pivots or journals $d\ d$ to enter corresponding bearings in the spindle A, and leading from the ends of its recess. By eccentric pivots or journals is meant such as are arranged eccentric to the axis of the tongue, or nearer its upper than its lower edge. Figs. 7 and 8 are inner-side views of the spindle A and the tongue B. From the tongue B, which turns laterally in the recess of the part $a$, there is extended, near the head $h$ of the spindle, an arm, $e$, and from the end of the chamber $f$ of the shuttle-body C there is projected, in manner as shown, a stud or abutment, $g$, with which the arm $e$ is forced into contact during a depression of the spindle, in consequence of which the tongue B will be partially revolved, and caused thereby to fit tightly to the cop and draw it closely against the part $a$.

On the spindle being turned up, so as to raise the arm $e$ out of contact with the said abutment $g$, the tongue will be free to turn, and will turn back toward the spindle and relieve the cop from pressure, and thereby leave it loose upon the spindle.

I claim—

In a loom-shuttle, the rotary tongue B, its eccentric journals $d\ d$, and arm $e$, in combination with and applied to the recessed spindle A, in manner as described, so as to operate, as explained, with a stud or projection, $g$, extended from the shuttle-body, all being essentially and for the purpose as specified.

FRANCIS BLANDING.

Witnesses:
THOMAS E. GROVER,
KILBURN R. CLIFFORD.